(12) United States Patent
Virgin et al.

(10) Patent No.: US 8,550,469 B2
(45) Date of Patent: Oct. 8, 2013

(54) MULTI-LAYERED COMPOSITE GASKET

(75) Inventors: Wilford Dean Virgin, Spring Grove, IL (US); Deepak Ponnavolu, Glenview, IL (US); Michael Shirilla, Chicago, IL (US); Carlos Santiago, Deerfield, IL (US); Curtis Arthur Brandt, Lindenhurst, IL (US)

(73) Assignee: Federal-Mogul Corporation, Southfield, MI (US)

( * ) Notice: Subject to any disclaimer, the term of this patent is extended or adjusted under 35 U.S.C. 154(b) by 615 days.

(21) Appl. No.: 12/699,310

(22) Filed: Feb. 3, 2010
(Under 37 CFR 1.47)

(65) Prior Publication Data

US 2010/0207334 A1      Aug. 19, 2010

Related U.S. Application Data

(60) Provisional application No. 61/152,456, filed on Feb. 13, 2009.

(51) Int. Cl.
*F16J 15/08*      (2006.01)
*F16J 15/14*      (2006.01)

(52) U.S. Cl.
USPC .......................................... 277/654; 277/592

(58) Field of Classification Search
CPC ............................. F16J 15/0825; F16J 15/104
USPC .................. 277/592–598, 651, 653, 654
See application file for complete search history.

(56) References Cited

U.S. PATENT DOCUMENTS 2,055,471 A * 9/1936 Balfe .............................. 277/592
2,711,334 A * 6/1955 Balfe .............................. 428/597

(Continued)

FOREIGN PATENT DOCUMENTS

DE        3715858 A1    12/1987
DE        4445763 A1    6/1995
JP        6257673 A     9/1994

OTHER PUBLICATIONS

Victocor 500 Cylinder-Head Gaskets flyer, Victor Reinz Sealing Products, 2008 Dana Limited (http://www.dana.com/Automotive_Systems/images/PDFs/Victocor500%205-2008.pdf).
International Search Report for EP 10 74 1570 mailed on Jan. 23, 2013.

*Primary Examiner* — Vishal Patel
*Assistant Examiner* — Nathan Cumar
(74) *Attorney, Agent, or Firm* — Robert L. Stearns; Dickinson Wright, PLLC

(57) ABSTRACT

A multi-layered composite gasket (10) includes three, preferably metallic cores (12, 14). A solid center core (12) is flanked on both sides by bonded paper layers (30). Perforated cores (14) mechanically interlock with each paper layer (30) through inwardly directed tangs (22). Graphite layers (26) are disposed outside of each perforated core (14) and are mechanically interlocked thereto by outwardly directed tangs (20) extending from the perforated cores (14). When using the gasket (10) material for sealing cylinder heads in internal combustion engines, a fire ring (46) may be affixed with a fire ring holder (48). The gasket (10) can be manufactured by making first and second preform sheets (32) comprised of one perforated core (14) sided with one paper layer (30) and one graphite layer (26). The preform sheets (32) are then bonded to a center core (12) using a heat activated adhesive. Combining rollers (42) compress and densify the layers to form the completed material set which can be stored on a coil (44) or cut into sheets.

18 Claims, 7 Drawing Sheets

(56) References Cited

U.S. PATENT DOCUMENTS

| | | |
|---|---|---|
| 5,275,139 A | 1/1994 | Rosenquist |
| 5,362,074 A * | 11/1994 | Gallo et al. .................. 277/592 |
| 5,410,997 A | 5/1995 | Rosenquist |
| 5,468,003 A * | 11/1995 | Staab et al. .................. 277/592 |
| 5,482,014 A | 1/1996 | Rosenquist et al. |
| 6,237,919 B1 | 5/2001 | Grant-Acquah |
| 6,247,704 B1 * | 6/2001 | Battistoni .................. 277/592 |
| 6,451,398 B1 * | 9/2002 | Sylvester .................. 428/41.8 |
| 2003/0230857 A1 | 12/2003 | Antonini |
| 2006/0006609 A1 | 1/2006 | Sandford |

* cited by examiner

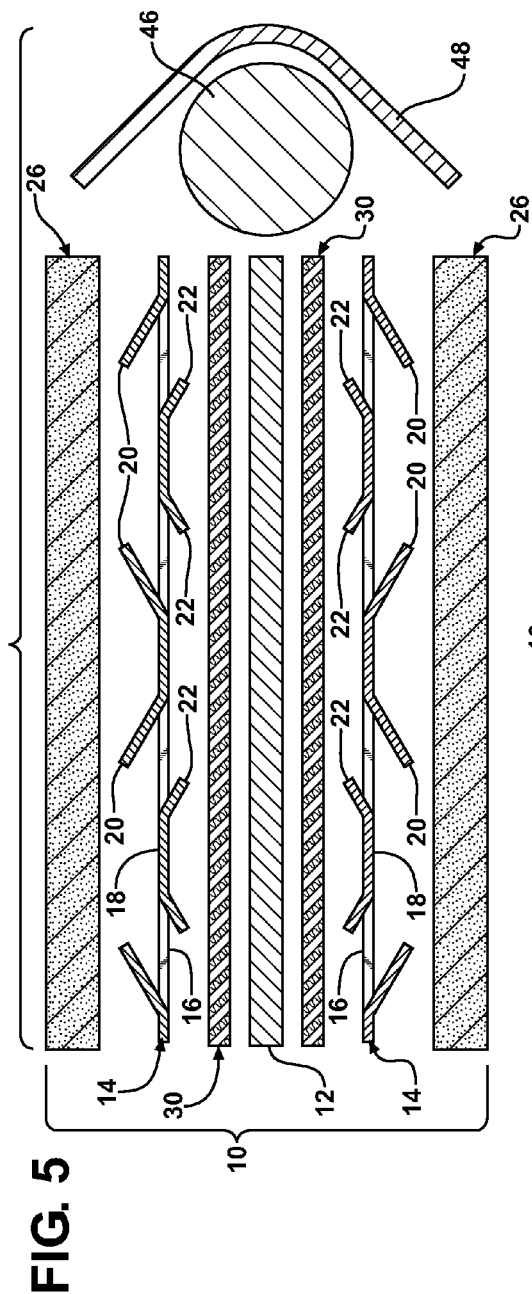

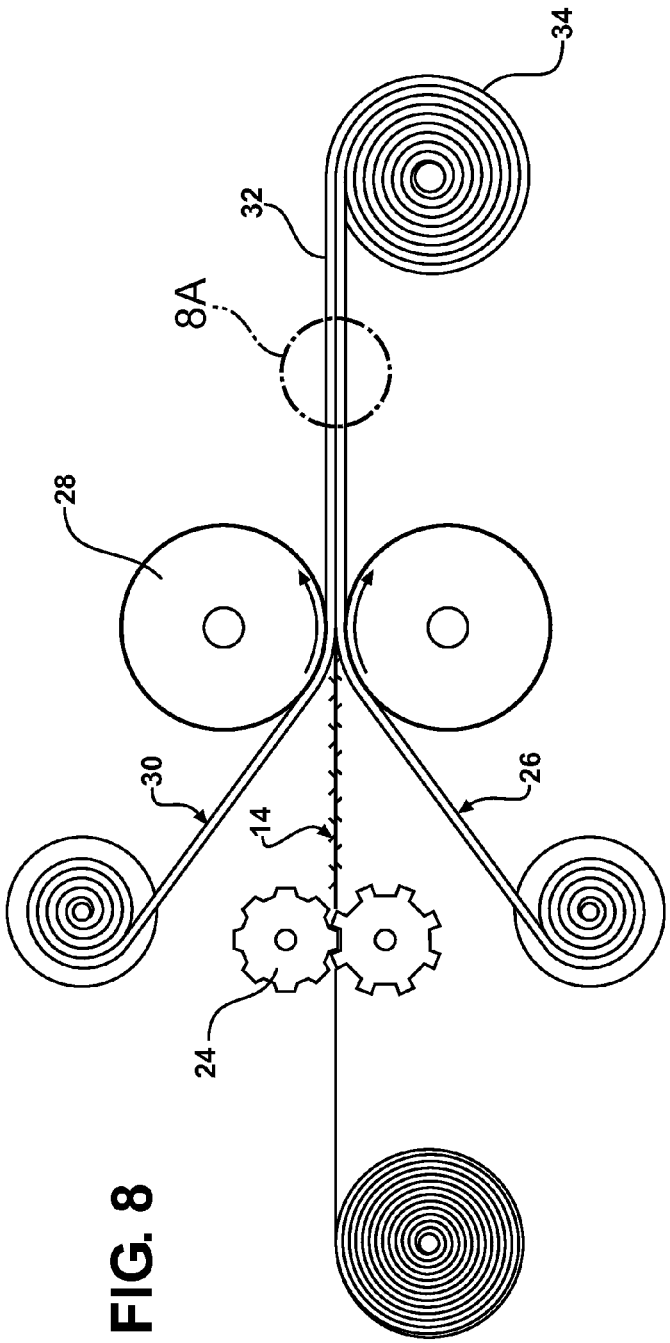
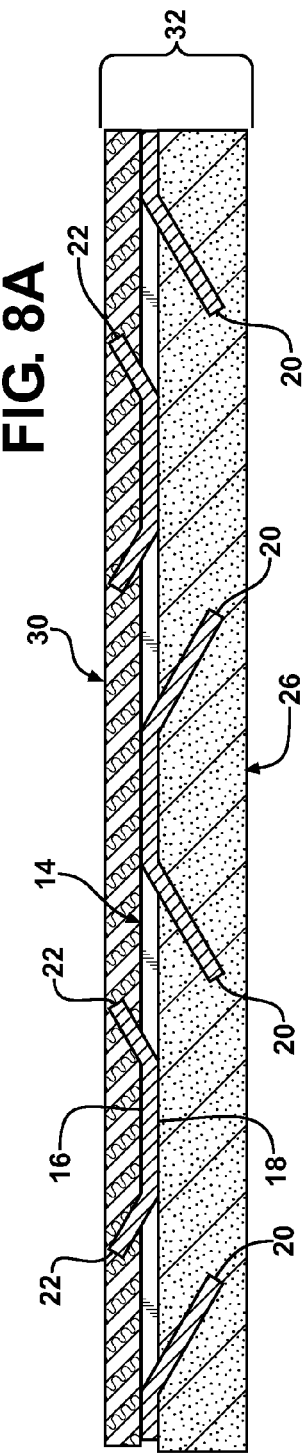

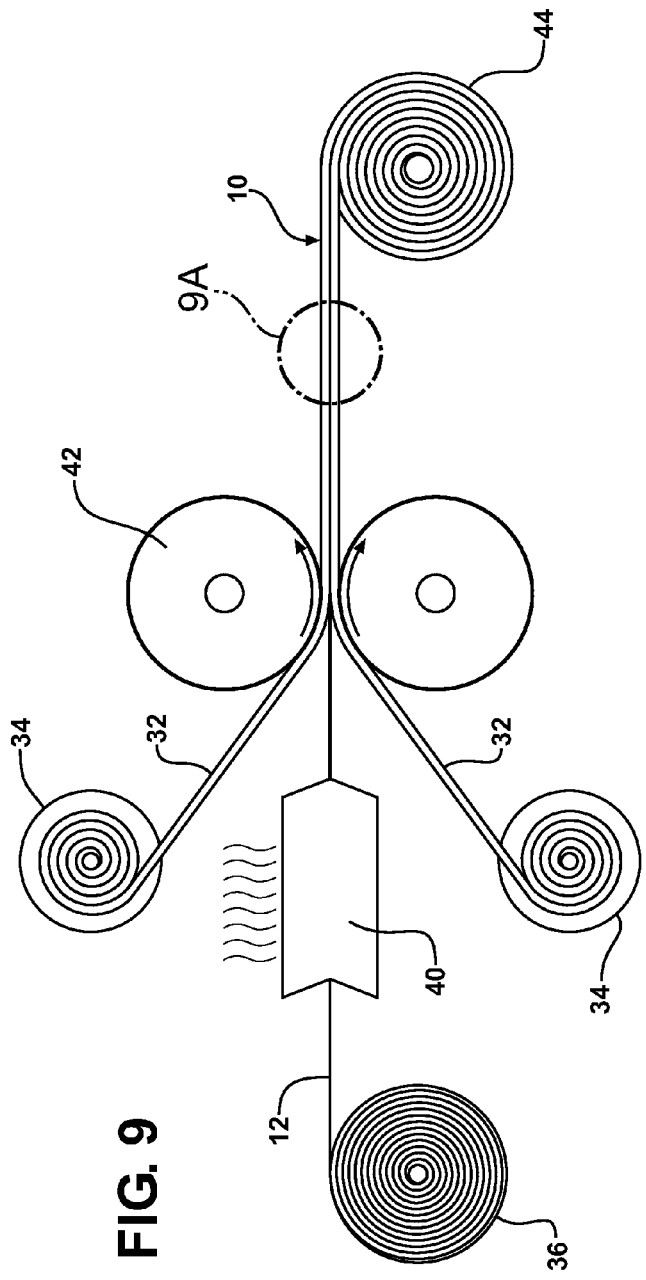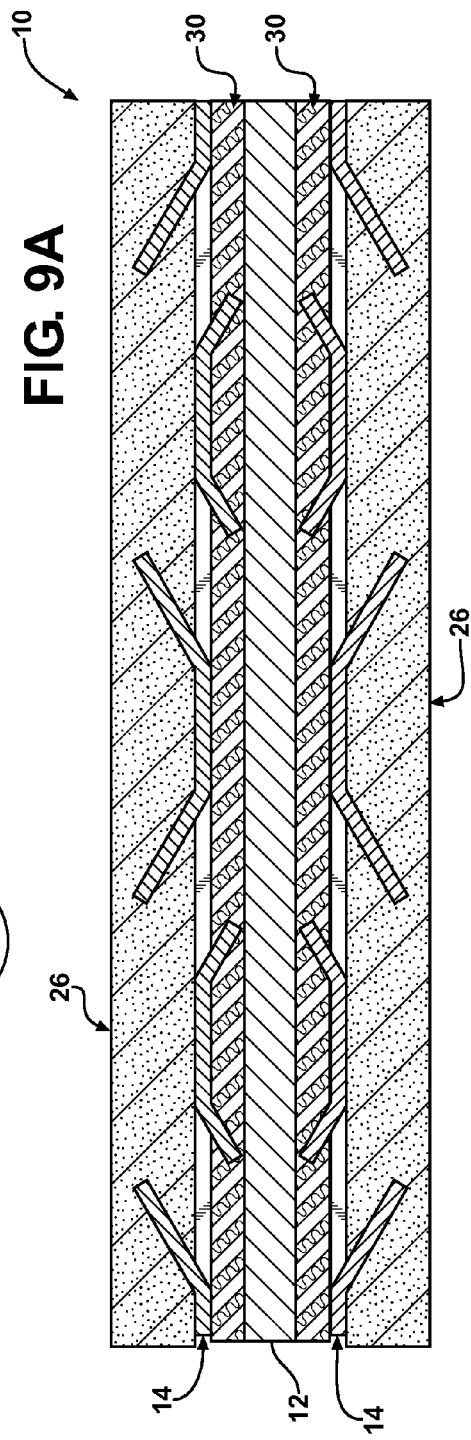

MULTI-LAYERED COMPOSITE GASKET

CROSS REFERENCE TO RELATED APPLICATIONS

This application claims priority to Provisional Patent Application No. 61/152,456 filed Feb. 13, 2009, the entire disclosure of which is hereby incorporated by reference and relied upon.

BACKGROUND OF THE INVENTION

1. Field of the Invention

This invention relates to a multi-layered composite gasket and method of making a gasket.

2. Related Art

Gaskets are used in many applications to perfect a fluid-tight seal between two mating members. The gasket is typically clamped between the mating members and held there in compression. In the case of internal combustion engines, many gaskets are used in various capacities. As one example, the head gasket is one which is positioned between the cylinder block and cylinder head of an engine to prevent the leakage of combustion gases from the combustion chambers during use of the engine. However, the head gasket in this application not only seals the combustion chambers, but also various coolant and lubrication flow passages that extend between the cylinder block and head.

An example of a prior art head gasket is illustrated in FIG. 1, with four large, generally circular openings representing the periphery of four side-by-side combustion chambers. A plurality of smaller openings are shown dispersed about a gasket for conducting coolant, lubrication and accommodating bolts used to establish clamping pressure. It will be readily apparent that a gasket, such as the exemplary head gasket, must be capable of maintaining a fluid-tight seal for various fluid mediums, including high temperature/high pressure gases, water or ethylene glycol-based coolants, lubricating oils and the like all operating at different temperatures, different pressures, and having different chemical compositions.

Accordingly, designing a gasket to function satisfactorily over an extended duty range can be quite difficult. The prior art has developed numerous gasket styles and compositions for these purposes, some of which are better suited to certain applications. One such gasket construction known in the prior art consists of a multi-layered composite gasket like that shown in FIGS. 2 and 3, and which correspond, generally, to the gasket described in U.S. Pat. No. 5,468,003 to Staab et al., issued Nov. 21, 1995, the disclosure of which is incorporated here by reference. This patent describes a cylinder head gasket used predominantly in high performance diesel engine applications. The gasket is composed of five layers, including a steel center layer to which is bonded a flanking perforated steel layer on each side. The perforated steel layers have outwardly extending tangs which establish a mechanically interlocking engagement with outer graphite layers. These five layers—center, two perforated, and two graphite—comprise the body of the gasket assembly. Combustion openings are rimmed with fire rings dressed with a thin sheet metal fire ring holder which directly engages the multi-layered composite gasket body.

While the prior art gasket construction depicted in FIGS. 2 and 3 is known to be moderately effective in certain applications, there are aspects of the construction that could be improved to gain better performance. In particular, the solid core center layer is affixed directly to the two facing perforated steel layers by an adhesive compound for the purpose of resisting combustion pressures. The outer graphite facing layers are mechanically bonded to the perforated metal layers to provide a fluid seal against the clamping faces of the cylinder head and block (shown in simplified fashion in FIG. 2). The rigid adhesive glue joint provides a sealing function between the perforated and center metal layers.

In use, a gasket in an engine is subjected to varying loads from the forces of combustion and heating cycles which impart sheer stresses to the gasket as the head and block expand and contract at different rates or otherwise move relative to one another due to dynamic forces. Sheer loads are thus created in the body of the gasket, which can weaken and possibly break the rigid glue layers between the perforated metal layers and the central metal core. It has been observed that sheer loads resisted within the body of the gasket can weaken and possibly break the rigid glue layers and thereby present a possible leak path for fluids through the gasket body. If the glue layers do not break under sheer loading, then the sheer loads are borne almost entirely by the graphite layers, putting these layers under undue sheer stresses which can, over time, compromise their ability to maintain a good seal against the mating members. Thus, prior art gasket constructions like that depicted in FIGS. 2 and 3 suffer from shortened service life because of failure modes resulting from undue sheer stresses.

Accordingly, there is a need in the art for an improved multi-layer composite gasket construction of the type to be clamped between mating members for perfecting a fluid-tight seal therebetween.

SUMMARY OF THE INVENTION

According to this invention, a multi-layered composite gasket is provided of the type to be clamped between mating members so that a fluid-tight seal can be established therebetween. The gasket comprises a center core layer having oppositely facing sides. A pair of perforated core layers are arranged on opposite sides of the center core. Each perforated core has a proximal surface facing toward the center core and a distal surface facing away from the center core. A pair of outer graphite layers are provided. Each graphite layer is mechanically interlocked with the distal surface of a respective one of the perforated cores. A pair of paper layers are provided. Each paper layer is disposed between one of the perforated cores and the center core. Each paper layer is mechanically interlocked with the proximal surface of its respective perforated core and affixed to the center core layer.

A gasket assembled according to the techniques of this invention reduces the buildup of sheer loads caused by relative movement between the mating members. The paper layers disposed between the respective perforated cores and the center core can function as slip planes to enable slight lateral shifting of the perforated cores relative to the center core which thereby relieve sheer loads in use without detracting from the sealing function of the gasket. The graphite layers are able to maintain their seals against the mating members even during adverse, dynamic conditions. Accordingly, the gasket manufactured according to this invention is able to accommodate dynamically changing compressive and sheer forces placed on the gasket in use, while maintaining excellent sealing capabilities over an extended duty range.

According to another aspect of this invention, a method is provided for forming a multi-layer composite gasket of the type clamped between mating members. The method comprises the steps of making a first preformed sheet according to the following steps: providing a perforated core layer having a proximal surface and a distal surface, providing an outer graphite layer, mechanically interlocking the graphite layer to the distal surface of the perforated core, providing a paper layer and mechanically interlocking the paper layer to the proximal surface of the perforated core. A second preformed sheet is made according to the same steps used to make the first preformed sheet. A center core layer is provided having oppositely facing sides. The paper layer from the first preformed sheet is bonded to one side of the center core, while the paper layer from the second preformed sheet is bonded to the opposite side of the center core. As a result, the center core is sandwiched between the first and second preformed sheets, with the paper layers thereof bonded directly to the center core. By this method, a multi-layered composite gasket can be manufactured which overcomes the shortcomings and deficiencies inherent in prior art gasket designs.

BRIEF DESCRIPTION OF THE DRAWINGS

FIG. 5 is an exploded view depicting the layered composition of the gasket of FIG. 4;

FIG. 6 is an enlarged, fragmentary cross-sectional view of the subject gasket;

FIG. 8 is a simplified schematic illustrating a first step in the manufacturing process of this invention, wherein a first preform sheet is made by mechanically interlocking a graphite layer and a paper layer to opposite sides of a perforated core;

FIG. 8A is an enlarged view of the first preformed sheet indicated at 8A in FIG. 8;

FIG. 9 is a simplified schematic view depicting the bonding of a first preformed sheet and a second preformed sheet to opposite sides of a center core layer; and FIG. 9A is an enlarged view of the area indicated at 9A in FIG. 9.

DETAILED DESCRIPTION OF THE PREFERRED EMBODIMENT

Figure 1:
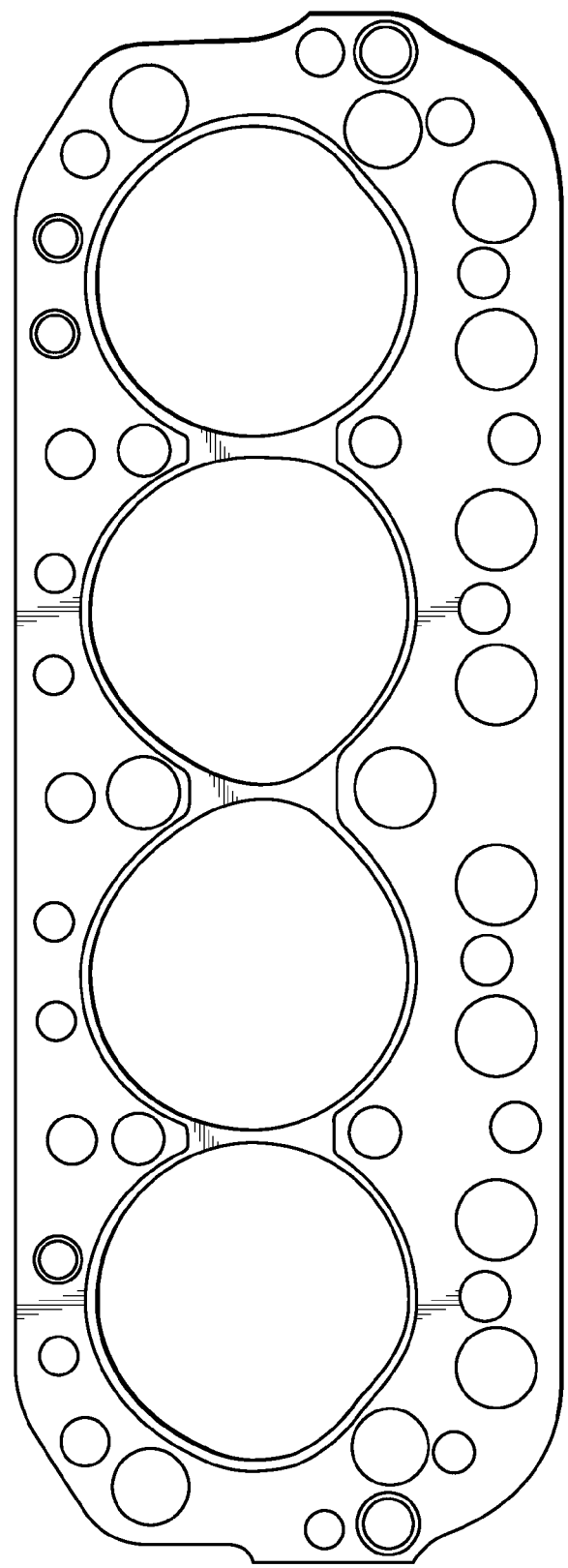
FIG. 1 is a plan view showing a standard prior art gasket such as may be used in sealing a cylinder head to a block in an internal combustion engine.
Figure 2:
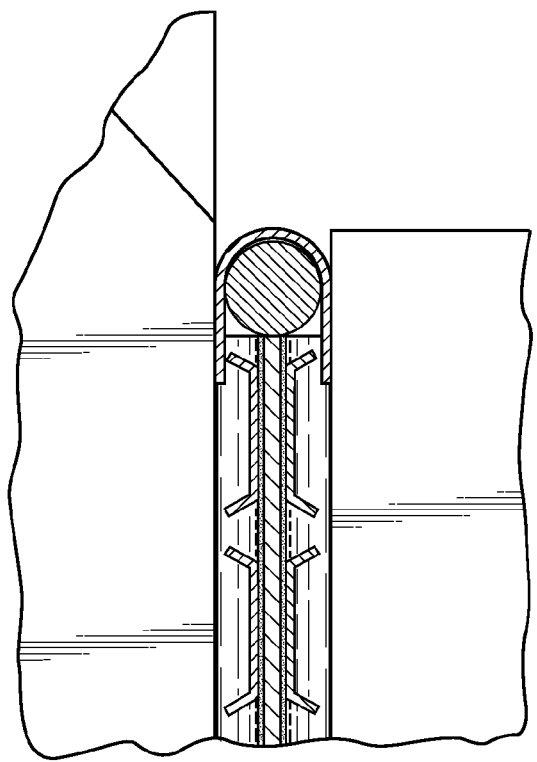
FIG. 2 represents a fragmentary view of a prior art gasket clamped between two mating members which, for illustrative purposes, may comprise a cylinder head and a block of the type common in internal combustion engines.
Figure 3:
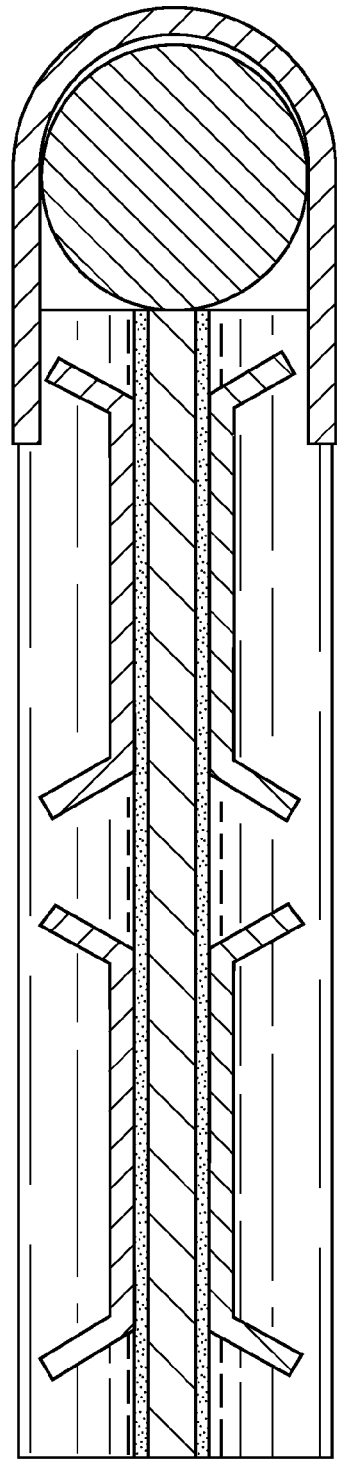
FIG. 3 is an enlarged, cross-sectional and fragmentary view of the prior art gasket shown in FIG. 2.
Figure 4:
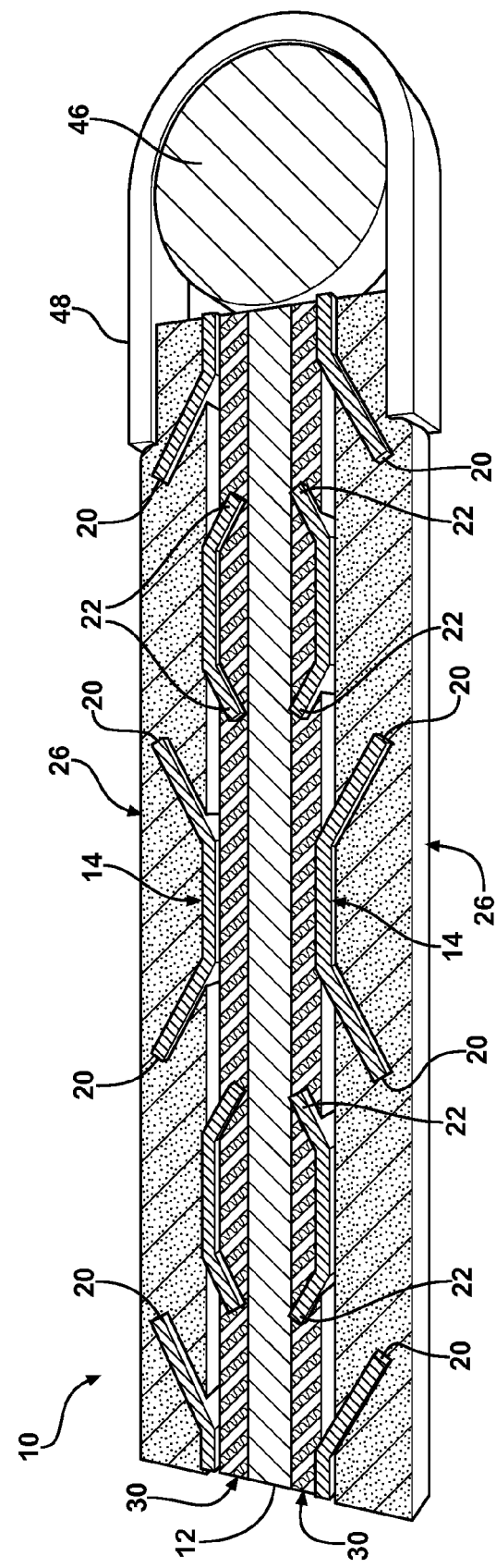
FIG. 4 is a fragmentary, cross-sectional view, shown in perspective, of a multi-layered composite gasket according to this invention.

Referring to the figures, wherein like numerals indicate like or corresponding parts throughout the several views, a gasket according to this invention is generally shown at 10 in FIGS. 4-6. The gasket 10 includes a metallic, preferably steel, center core layer 12 having oppositely facing sides. Preferably, the center core 12 has a generally uniform thickness and is formed without discontinuities or irregularities so as to establish a continuous, uninterrupted barrier throughout the gasket 10. The center core 12 may be supplied in roll form on a coil 36, like that shown in FIG. 9, or in sheet form. The center core 12 may have a thickness ranging between about 0.13 and about 6.35 millimeters. The center core 12 may be provided with a coarse surface finish if the specifications for a particular application so dictate.

Figure 7:
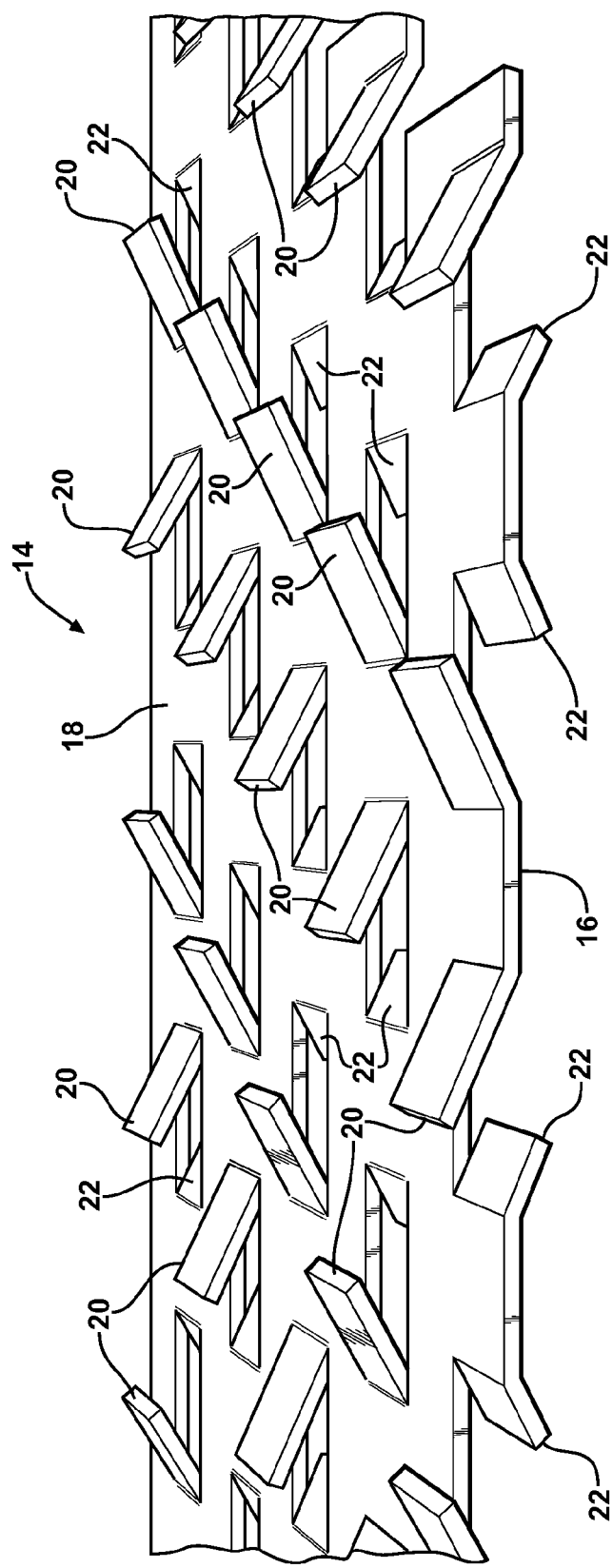
FIG. 7 is a fragmentary perspective view of a perforated core layer according to this invention.

A pair of substantially identical perforated metal core layers, each generally indicated at 14, are arranged on opposite sides of the center core 12. The perforated cores 14 are preferably made from low-carbon or stainless steel, but other compositions including even non-metallic compositions, may be substituted under appropriate circumstances. The perforated cores 14, in one exemplary embodiment, have a thickness ranging between about 0.15 and about 0.30 millimeters. As perhaps best shown in FIGS. 5-7, the perforated cores 14 each include a proximal surface 16 and a distal surface 18. In each case, the proximal surface 16 is that side which faces toward the center core 12, whereas the distal surface 18 faces in a direction away from the center core 12. A plurality of outwardly directed tangs 20 extend away from the distal surface 18 of each perforated core 14. In a somewhat similar fashion, a plurality of inwardly directed tangs 22 extend from the proximal surface 16 of each perforated core 14. The tangs 20, 22 may take the form of punch tabs or pieces bent integrally from the sheet-like membrane or stock in a roll forming or other type of manufacturing operation. In the preferred embodiment of this invention, the tangs 20, 22 are formed simultaneously by passing raw sheet stock through the nip of punch rollers 24, as shown in FIG. 8. Of course, other forming techniques are possible. FIG. 7 shows one exemplary form taken by the tangs 20, 22. Here, one inwardly directed tang 22 opposes each outwardly directed tang 20, such that they appear in something of a nose-to-nose fashion. The bending of each tang 20, 22 away from the base stock material of the perforated cores 14 creates a void or opening in the stock material, thereby establishing its perforated characteristics.

In practice, the outwardly directed tangs 20 are longer than the inwardly directed tangs 22, with both being bent away from the general plane of the stock membrane by an equal but opposite acute angle. Of course, other angular orientations are possible, and it is not necessary that the inwardly directed tangs 22 be bent away from the plane of the stock membrane by an equal but opposite angle to that of the outwardly directed tangs 20. In other words, it is possible that the outwardly directed tangs 20 may be oriented at 90 degrees orthogonally relative to the plane of the core 14, whereas the inwardly directed tangs 22 are bent at some acute angle less than 90 degrees. Those of skill in the art will envision many alternative configurations for the shapes of the tangs 20, 22, their relationship to the voids or openings in the perforated core 14, their relative numbers and spacings, and the angles at which they are bent away from their respective proximal 16 and distal 18 surfaces. As perhaps best shown in FIG. 6, the orthogonal projection of the outwardly directed tangs 20, i.e., the distances measured normal to the plane of the stock membrane, is greater than the orthogonal projection of the inwardly directed tangs 22 from the proximal surface 16. Thus, in the example illustrated wherein the tangs 20, 22 project from their respective distal 18 and proximal 16 surfaces by equal but opposite angles, the outwardly directed tangs 20 are formed longer so that their orthogonal projection can be greater. Of course, it would be possible to make the tangs 20, 22 equal in length, but maintain the unequal orthogonal projections by altering the angles at which they are bent relative to the plane of the perforated core 14.

A pair of outer graphite layers, each generally indicated at 26, are provided consistent with well-known principles of head gasket construction associated with perforated core structures. The graphite layers 26 are mechanically interlocked with the distal surface 18 of the respective perforated core 14 via the outwardly directed tangs 20. This can be accomplished by compressing the graphite in sheet form against the distal surface 18 of the perforated core 14 so that the outwardly directed tangs 20 embed themselves within the graphite material. As shown in FIG. 8, this can be accomplished by passing graphite material in rolled sheet form together with a perforated core 14 through the nip of a compression roller set 28. This mechanically interlocking step can be accomplished in-line together with the formation of the tangs 20, 22 as illustrated in FIG. 8, or can be accomplished in distinct operations or batch processes. The thickness of the graphite layers 26 are somewhat variable, but in the preferred embodiment of this invention, the thickness of each graphite layer 26 is equal to or slightly greater than the orthogonal projection of the outwardly directed tangs 20, as shown in FIGS. 4 and 6 where the tips of the outwardly directed tangs 20 do not break the distal outer surface of the respective graphite layers 26. Those of skill in the art, however, will envision some applications wherein the outermost tips of the outwardly directed tangs 20 can be seen through the graphite layers 26.

A pair of paper layers, generally indicated at 30, is also provided within the gasket 10. The paper layers 30, known sometimes as beater sheets, are substantially identical to one another in thickness and composition and are each disposed between a respective one of the perforated cores 14 and the center core 12 as shown in FIGS. 4-6. Each paper layer 30 is mechanically interlocked with the proximal surface 16 of one of the perforated cores 14 by way of the inwardly directed tangs 22. Each paper layer 30 is also affixed with the center core 12. Thus, as shown in the figures, the center core 12 appears sandwiched between the two paper layers 30. These paper layers 30 accommodate relative dynamic slippage between the perforated cores 14 and the center core 12 during use of the gasket 10 so as to dissipate sheer stress caused by relative movement between the mating members being sealed. In some cases, it may be desirable to use a bonding agent, e.g., a nitrile phenolic composition, between the paper layers 30 and their respective perforated core 14 to help hold all layers together during manufacturing and installation of a gasket 10. In such cases, the paper layers 30 are either received from a material supplier with the adhesive pre-applied in an unactivated form, or the adhesive is applied in a subsequent processing step.

The mechanical interlocking of the paper layers 30 to the perforated cores 14 can be accomplished simultaneously with the mechanical interlocking of a graphite layer 26 by simultaneously passing a paper layer 30 through the same compression roller set 28. The resulting composition, as shown in FIG. 8A, represents a preform sheet 32 which is densified and/or sized to specification by the compression roller set 28. The preform sheet 32 can be cut and collected as sheets, or wound on a spool 34 for future processing.

The orthogonal projection of the inwardly directed tangs 22 is preferably less than or equal to the thickness of the paper layers 30, so that the extended tips of the inwardly directed tangs 22 do not pass completely through the paper layers 30. In other words, as shown in FIG. 6, there may remain a slight spacing between the inwardly directed tangs 22 and the center core 12. However, this specification is subject to alteration depending upon the application and design characteristics needed. Likewise, the relative thicknesses between the paper layers 30 and graphite layers 26 may be such that the paper layers 30 are thinner as shown in the figures, however this is also not an inviolate specification.

FIG. 9 depicts a method for forming the multi-layered composite gasket 10 using first and second preform sheets 32 carried on respective spools 34. Raw stock for the center core 12 is carried on a coil 36. An adhesive material is either applied to or pre-exists on both oppositely facing sides of the center core 12 in substantially equal quantities. The adhesive may take any of the known and suitable forms, including but not limited to a nitrile phenolic composition. As illustrated, the adhesive will have been pre-applied to the center core 12 and reside there in a dormant, inactivate dry form in the wound coil 36. However, it will be understood that the adhesive can alternatively be applied as the core 12 is unwound from the coil 36 in dry film form or in suspension through a brushing, rolling, spraying or other appropriate application technique. In other words, the coil 36 is either received from a material supplier with the adhesive pre-applied, or the adhesive is applied to both sides of the core material stock at some point after it is unwound from the coil 36. In cases where an inactive adhesive must be activated, the coated center core material is passed through a heater 40 which melts and/or activates the adhesive film. In one possible variation, the adhesive could be applied directly to the paper layers 30 rather than to the core 12 using either a pre-applied or in-process application technique. This variation may be desirable if both sides of the paper layers 30 are to be coated with adhesive.

First and second preform sheets 32 meet the center core 12 with melted adhesive in the nip of a combining roller set 42, as shown in FIG. 9. The orientation of the preform sheets 32 as they are carried on their spools 34 is such that the paper layers 30 of each are presented toward the center core 12 and the respective graphite layers 26 are facing to the outside. The combining rollers 42 then compress these layers together, thereby shaping the materials to final specifications of thickness and/or density. The completed gasket material 10 exits the combining roller set 42 and may be either cut into sheets or stored on a coil 44 as shown in FIG. 9. The gasket material fed to the coil 44 appears like that shown in FIG. 9A.

In the process of transforming the raw gasket material 10 into a finished gasket, cutting, dressing or further operations may be required. For example, FIGS. 4-6 illustrate fractional cross-sections of a head gasket made from the multi-layered composite material. In this case, as is customary, it is necessary to install a fire ring 46 around the periphery of any combustion chamber openings, covered by a fire ring hold 48 whose edges overlap the graphite layers 26 and provide durability and stopper height adjustment as needed in head gasket applications. It will be appreciated that other uses of the gasket material 10 can be used to make gaskets which are not intended for sealing a cylinder head in an internal combustion engine, and therefore the fire ring 46 and holder 48 may be omitted. Likewise, grommets or other features may be included so that the gasket 10 can be used any suitable application.

By introducing paper layers 30 between the perforated cores 14 and the center core 12, the paper layers 30 are able to provide a slip plane so that lateral sheer loads do not build up within the body of the gasket 10 and ultimately lead to fluid leaks. The composition of the adhesive applied between the paper layers 30 and the center core 12 is such that slippage can occur either within the adhesive itself, at the interface between the adhesive and center core 12, at the interface of the paper layers 30 and perforated cores 14, or within the body of the paper layers 30. In other words, the yield strength of the adhesive and/or paper layers 30 and/or interfaces are such that they will give before the sheer loads may build to problematic levels.

The foregoing invention has been described in accordance with the relevant legal standards, thus the description is exemplary rather than limiting in nature. Variations and modifications to the disclosed embodiment may become apparent to those skilled in the art and fall within the scope of the inven-

What is claimed is:

1. A multi-layered composite gasket of the type clamped between mating members for perfecting a fluid-tight seal, said gasket comprising:
   a center core layer having oppositely facing sides;
   a pair of perforated core layers arranged on opposite sides of said center core, each said perforated core having a proximal surface facing toward said center core and a distal surface facing away from said center core each said perforated core includes a plurality of outwardly directed tangs extending from said distal surface and a plurality of inwardly directed tangs extending from said proximal surface thereof;
   a pair of outer graphite layers, each said graphite layer mechanically interlocked with said distal surface of a respective one of said perforated cores;
   and a pair of paper layers, each said paper layer disposed between a respective one of said perforated cores and said center core, each said paper layer mechanically interlocked with said proximal surface of the respective said perforated core and affixed to said center core, whereby said paper layers facilitate relative dynamic slippage between said perforated cores and center core during use of said gasket.

2. The gasket of claim 1 wherein said perforated cores are substantially identical to one another.

3. The gasket of claim 2 wherein said graphite layers have a generally equal and uniform thickness, and wherein the orthogonal projection of said outwardly directed tangs relative to said center core is less than or equal to said thickness of graphite layers.

4. The gasket of claim 3 wherein said paper layers have a generally equal and uniform thickness, and wherein the orthogonal projection of said inwardly directed tangs relative to said center core is less than or equal to said thickness of paper layers.

5. The gasket of claim 4 wherein said thickness of said paper layers is less than said thickness of said graphite layers.

6. The gasket of claim 4 wherein the orthogonal projection of said outwardly directed tangs relative to said center core is greater than said thickness of paper layers.

7. The gasket of claim 1 further including a void between at least two adjacent of said outwardly and inwardly directed tangs.

8. The gasket of claim 1 further including an adhesive disposed between each said paper layer and said center core.

9. The gasket of claim 1 wherein said center core is fabricated from a substantially metallic material.

10. The gasket of claim 1 wherein said perforated core is fabricated from a substantially metallic material.

11. A multi-layered composite gasket of the type clamped between mating members for perfecting a fluid-tight seal, said gasket comprising:
    a metal center core layer having oppositely facing sides;
    a pair of substantially identical perforated metal core layers arranged on opposite sides of said center core, each said perforated core having a proximal surface facing toward said center core and a distal surface facing away from said center core, each of said perforated cores including a plurality of outwardly directed tangs extending from said distal surface and a plurality of inwardly directed tangs extending from said proximal surface;
    a pair of outer graphite layers having a generally equal and uniform thickness, each said graphite layer mechanically interlocked with said distal surface of a respective one of said perforated cores; and
    a pair of paper layers having a generally equal and uniform thickness less than said thickness of said graphite layers, each said paper layer disposed between a respective one of said perforated cores and said center core, each said paper layer mechanically interlocked with said proximal surface of the respective said perforated core and adhesively bonded to said center core.

12. A method for forming a multi-layered composite gasket of the type clamped between mating members for perfecting a fluid-tight seal, said method comprising the steps of:
    a) making a first preform sheet according to the steps of:
       1) providing a perforated core layer having a proximal surface and a distal surface, having a plurality of outwardly directed tangs extending from the distal surface and a plurality of inwardly directed tangs extending from the proximal surface;
       2) providing an outer graphite layer;
       3) mechanically interlocking the graphite layer to the distal surface of the perforated core;
       4) providing a paper layer
       5) mechanically interlocking the paper layer to the proximal surface of the perforated core;
    b) making a second preform sheet according to said steps a)1)-a)5);
    c) providing a center core layer having oppositely facing sides;
    d) bonding the paper layer of the first preform sheet to one side of the center core; and
    e) bonding the paper layer of the second preform sheet to the opposite side of the center core, whereby the center core is sandwiched between the first and second preform sheets with the paper layers thereof.

13. The method of claim 12 further including the step of roll-compressing the formed multi-layered composite gasket to final thickness and/or density.

14. The method of claim 12 wherein said step of mechanically interlocking the graphite layer includes forcibly seating the outwardly directed tangs into the graphite layer.

15. The method of claim 12 wherein said step of mechanically interlocking the paper layer includes forcibly seating the inwardly directed tangs into the paper layer.

16. The method of claim 12 wherein said steps of bonding the paper layers for the first and second preform sheets include applying an adhesive to at least one of the center core and the paper layers.

17. The method of claim 16 wherein said step of applying an adhesive includes heating the adhesive together with the center coil.

18. The method of claim 12 wherein said steps of making the first and second preform sheets include roll-compressing.

* * * * *